United States Patent [19]

Finke et al.

[11] Patent Number: 4,749,768

[45] Date of Patent: Jun. 7, 1988

[54] PROCESS FOR PRODUCING THERMOPLASTICALLY PROCESSABLE AROMATIC POLYAMIDE WITH PHOSPHORUS CATALYST

[75] Inventors: Juergen Finke, Marl; Martin Bartmann, Recklinghausen, both of Fed. Rep. of Germany

[73] Assignee: Hüls Aktiengesellschaft, Marl, Fed. Rep. of Germany

[21] Appl. No.: 14,841

[22] Filed: Feb. 13, 1987

[30] Foreign Application Priority Data

Mar. 18, 1986 [DE] Fed. Rep. of Germany ....... 3609011

[51] Int. Cl.⁴ .............................................. C08G 69/28
[52] U.S. Cl. .................... 528/172; 528/173; 528/179; 528/336; 528/348
[58] Field of Search ............... 528/172, 173, 179, 336, 528/348

[56] References Cited

U.S. PATENT DOCUMENTS

3,859,252 1/1975 Cho ..................................... 528/173

Primary Examiner—Harold D. Anderson
Attorney, Agent, or Firm—Oblon, Fisher, Spivak, McClelland & Maier

[57] ABSTRACT

The invention relates to a process for producing aromatic polyamides by melt condensation of
(i) aromatic diamines of the formula

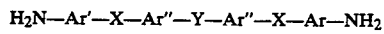

where $X=-O-$ and $Y=-SO_2-$ or $X=-SO_2-$ and $Y=-O-$ and Ar' and Ar"=meta-, para-phenylene, which can be replaced up to 70 mole percent by an aromatic diamine of the formula

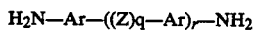

where Ar=meta— or para-phenylene; $Z=-O-$, $-S-$, $-SO_2-$, $-CO-$, or $-C(CH_3)_2-$ or mixtures thereof; q=0 or 1; r=0, 1 or 2 and of
(ii) isophthalic acid, which can be replaced up to 60 mole % by terephthalic acid, while both acids can be substituted for by an acid with the formula

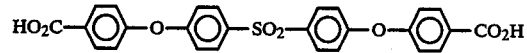

or a dicarboxylic acid with the general formula

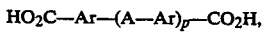

where $A=-O-$, $-S-$, $-SO_2-$, $-CO-$ or a single bond; and p=0 or 1; in the presence of triphenylphosphite or an acid with the formula $H_3PO_n$, where n=2, 3 or 4. The invention further relates to the aromatic polyamides produced by this process.

8 Claims, No Drawings

PROCESS FOR PRODUCING THERMOPLASTICALLY PROCESSABLE AROMATIC POLYAMIDE WITH PHOSPHORUS CATALYST

BACKGROUND OF THE INVENTION

1. Field of the Invention

The present invention relates to aromatic polyamides which have high temperature resistance and good mechanical properties, and which are thermoplastically processible.

2. Discussion of the Background

Aromatic polyamides with the repeating unit:

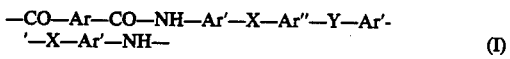

not only display high temperature resistance and good mechanical properties; they are also thermoplastically processable (see Elias/Vohwinkel, *New Polymer Materials for Industrial Use*, 2nd Ed. Carl Hanser Verlag 1983, pp. 242 ff). In repeating unit (I), X and Y alternatively stand For an ether and a sulfonyl group, and Ar, Ar' and Ar" stand independently of one another for the para- and meta- phenylene group.

Prior art processes for producing aromatic polyamides include the following:

1. Low temperature solution polycondensation by reacting aromatic dicarboxylic acid dichlorides with aromatic diamines in polar solvents (See U.S. Pat. Nos. 3,287,324; 3,541,056; 3,600,350; 3,819,587; 3,767,756; 3,869,429; 3,673,143; 3,817,941; 3,063,966; and German No. AS5 22 19 703).

The subject of U.S. Pat. No. 3,859,252 is thermoplastic condensation polymers with an aromatic bisamide structure. The compound in which R=H, X=SO$_2$ and Y=O contains repeating unit (I). It is produced from isophthaloylchloride and the corresponding diamine.

2. Interface polycondensation by reaction between an aromatic dicarboxylic acid dichloride and an aromatic diamine at the interface of an organic and an aqueous phase (See German No. OS 19 08 297 and OS 23 25 139; and German Pat. No. 30 06 899).

Aromatic polyamides can also be prepared by the reaction of aromatic dicarboxylic acids with aromatic diisocyanates (German Pat. No. 19 28 435) and by reacting aromatic dicarboxylic acid diaryl esters with aromatic diamines.

For example, Brode et al. describe the preparation of 4,4'- [sulfonylbis (p-phenyleneoxy)] to dianiline (X=O, Y=SO$_2$) from p-aminophenol and 4,4'-dichlorodiphenylsulfone and its condensation with aromatic acid chlorides such as terephthalic acid chloride, for example, to produce aromatic polyamides with glass temperatures (Tg) between 230° and 320° C. (See Polymer Prepr. Am. Chem. Soc. Div. Pol. Chem. 15, 761 (1974) and Adv. Chem. Ser. 142 (1975); See CA 84, 5530 s).

This process has the disadvantage that it calls for the use of activated, hard-to-handle monomers, such as dicarboxylic acid chlorides.

Processes are also known by which one can obtain aromatic polyamides directly by reaction of aromatic dicarboxylic acids and aromatic diamines in the presence of aromatic phosphites. N-methyl acid amides, particularly N-methylpyrrolidone, have been found to be good solvents for this process. With other dipolar aprotic solvents, such as dimethylsulfoxide, no polymer amides are obtained (See F. Higashi et al., J. Polym. Sci., Polym. Chem. Ed. 18, 1711 ff (1980).

In a summary (See S. M. Aharoni et al., J. Polym. Sci., Polym. Chem. Ed. 22, 2579 (1984), it is concluded that:

(i) the phosphite to be used must contain aryl groups and should preferably be a triphenyl phosphite;

(ii) the aryl phosphites must be used in at least such quantities that for each mole of amide to be substituted, one mole of a compound containing the grouping

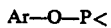

is added, since this grouping will be consumed during the course of the reaction, and this reaction is the driving force behind the transformation; and (iii) pyridine is not required for the reaction, but does have the effect of speeding up the reaction.

Finally, in European Pat. No. 0 099 997, a process for producing aromatic polyamides is disclosed in which aromatic dicarboxylic acids are reacted with aromatic diamines in a polar solvent in the presence of a dehydrating catalyst, such as a phosphorus-containing compound, for example. The polyamides disclosed cannot be thermoplastically processed because of their high softening points, which lie in the area of the decomposition temperature or even higher. If electron-rich aromatic diamines, such as 4,4'-diaminodiphenylether, are used in this process, long reaction times are required to obtain products of high molecular weight, and these products are heavily colored due to the formation of unidentified by-products. If, on the other hand electron-poor diamines such as 4,4'diaminodiphenylsulfone are used, the process according to European Pat. No. 0 099 997 fails to work altogether. All that is obtained are heavily colored oligomers.

In addition to these processes, in which condensation is performed in a solvent, attempts have also been made to produce polyamides in the melt. Thus, U.S. Pat. No. 3,109,836 discloses a process for producing polyamides with repeating units of (CO—Ar—NH) that consists of heating acetamidobenzoic acid for three hours in a vacuum at 200° to 300° C.

Contrary to the allegations in this patent, this process does not yield thermoplastically processable products, since the melting points of the products of the reaction lie in the area of the decomposition temperature or higher.

It has also been suggested that aromatic polyamides can be produced by amidation of acylated aromatic amines in the melt. Apart from the fact that such a proceeding would require the prior production of the acylated amines, the results obtained with this process must be considered highly unsatisfactory. In order to improve processibility, the starting compounds are not purely aromatic compounds, but rather a mixture including aliphatic compounds. The diamines are only partially, not completely acylated. Finally, acetic acid, an acetic anhydride, dimethyl acetamide or another agent is added to the reaction melt to improve the flowability. (See Keske et al., Polymer Prepr. 25, Part XXV, p. 25 (1984) and U.S. Pat. No. 3,654,227).

Even though Buhler's standard work on the subject, *Spezialplaste* (Specialized Plastics), Akademieverlag, Berlin (1978), states on page 412 that the method of melt polycondensation is not applicable to the preparation of aromatic polyamides from aromatic dicarboxylic acids and simple aromatic diamines, there exists a need for a process for producing aromatic polyamides by just this melt polycondensation method.

SUMMARY OF THE INVENTION

Accordingly, one object of the present invention is to provide a process for producing thermoplastic aromatic polyamides by a melt polycondensation method while avoiding the production of heavily colored compounds.

These objects and other objects of the present invention which will become apparent from the following specification have been achieved by the process of the present invention which produces high molecular weight aromatic polyamides by condensing an aromatic diamine and an aromatic dicarboxylic acid in the presence of a phosphorus-containing catalyst, wherein (i) said aromatic diamine has the formula

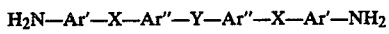

wherein Ar' and Ar" are a meta- or para-phenylene radical; X=—O— and Y=—SO$_2$— or X=—SO$_2$— and Y=—O—; wherein said aromatic diamine can be replaced up to 70 mole % by aromatic diamines with the formula

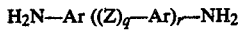

wherein Ar is meta-phenylene, para-phenylene; Z is —O—, —S—, —SO$_2$—, —CO— or —C(CH$_3$)$_2$— or mixtures thereof; q is 0 or 1; and r is 0, 1 or 2;

(ii) said aromatic dicarboxylic acid is (a) isophthalic acid, which may be replaced up to 60 mole % by terephthalic acid, wherein said isophthalic acid and said terephthalic acid may be substituted by at least one C$_1$–C$_6$ alkyl radical, alkyl-or aryl-substituted phenyl radical, C$_1$–C$_6$ alkoxy radical, phenoxy radical in which the phenyl ring can be alkyl- or aryl-substituted, or a halogen;

(b) an acid with the formula

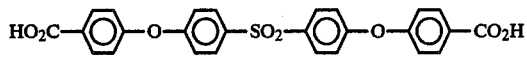

(c) or a dicarboxylic acid with the general formula

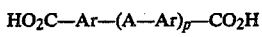

wherein Ar is meta-phenylene or para-phenylene; A is —O—, —S—, —SO$_2$—, —CO— or a single bond; and p=0 or 1, and wherein said catalyst is triphenylphosphite or an acid derived from phosphorus having the formula H$_3$PO$_n$, where n=2, 3 or 4 and (iii) said condensing step is performed in the melt of the starting materials.

DETAILED DESCRIPTION OF THE PREFERRED EMBODIMENTS

A process has now been found with which certain aromatic diamines can be reacted with certain aromatic dicarboxylic acids in the melt to yield aromatic polyamides. Surprisingly, the products obtained are not only thermoplastically processible, as known in the art, but display double refraction in the melt. The characterizing of liquid crystal phases by double refraction in the melt is described in U.S. Pat. No. 4,118,732. Thus, a new class of technically interesting aromatic polyamides has been uncovered.

The process for producing the polyamides of the present invention consists of reacting an approximately equimolar mixture of aromatic dicarboxylic acid and aromatic diamine in the presence of at least the minimum catalytically effective quantity of triphenylphosphite or an acid derived from phosphorus with the formula H$_3$PO$_n$ where 2≦n≦4 or a catalytically effective quantity of a mixture of the abovementioned phosphorus compounds and a 4-dialkylaminopyridine in the melt at temperatures between 200° and 380° C.

The addition of the tiny quantity of co-catalyst has the following substantial effects on the formation of the polyamide:

the viscosity number, which is a reflection of molecular weight, is substantially increased;

the color quality of the polymer is markedly improved;

the polycondensation time is drastically reduced;

the reaction temperature is greatly lowered; and the molecular weight of the polyamides obtained lies between 10,000 and 200,000, preferably between 20,000 and 70,000.

The following aromatic dicarboxylic acids or mixtures thereof may be used according to the invention:

(a) Isophthalic acid, which can be replaced by terephthalic acid up to 60 mole percent, while both acid groups may be substituted by at least one of the following radicals:

(a) C1–C6 alkyl;

(b) a phenyl radical which can be alkyl- or aryl-substituted (c) alkoxy radical with 1-6 C-atoms:

(d) phenoxy radicals, with alkyl- or aryl-substitution of the phenyl ring; or (e) a halogen, particularly chlorine and bromine, (b) a dicarboxylic acid with the formula

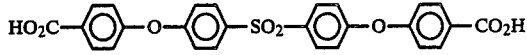

(See Lorenz et al., Macromolecular Chemistry 130, 65 (1969)).

(c) or a dicarboxylic acid of the general formula

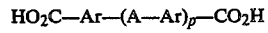

where Ar=meta-phenylene or para-phenylene; A=—O—, —S—, —SO$_2$—, —SO—or a single bond; and p=0 or 1.

The following aromatic diamines or mixtures thereof may be used according to the invention:

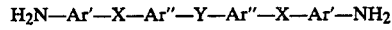

where Ar' and Ar" stand for meta- or in particular para-phenylene radicals; particularly:

4,4'-bis(4-aminophenoxy)diphenylsulfone (X=O, Y=SO$_2$) and 4,4'-bis(4-aminophenylenesulfonyl)diphenylether (X=SO$_2$, Y=O).

The compound where X=O and Y=SO$_2$ is obtained by reaction of p-aminophenol with 4,4'-dichlorodiphenylsulfone. The preparation of the compound where X=SO$_2$ and Y=O is described in U.S. Pat. No. 3,859,252.

Up to 70 mole percent of the diamines thus described can be replaced by the following aromatic diamines:

Aromatic diamines of the general formula:

$$H_2N-Ar\,((Z)_q-Ar)_r-NH_2$$

where Ar=meta-phenylene, para-phenylene; Z=at least one type of radical selected from the group —O—, —S—, —SO$_2$—, —CO—, or —C(CH$_3$)$_2$; q=0 or 1; and r=0, 1 or 2.

For one mole of aromatic diamines, 0.95 to 1.05 mole, preferably 1.0 mole of aromatic dicarboxylic acid is used.

The aromatic dicarboxylic acids are reacted with the diamines in the presence of a catalytic quantity of a phosphorus-containing compound or in the presence of a catalytic quantity of a mixture of said phosphorus containing compound and a 4-dialkylaminopyridine.

Suitable phosphorus-containing compounds are triphenylphosphite, hypophosphorous acid, phosphorous acid and phosphoric acid.

The 4-dialkylaminopyridines used as a co-catalyst have the following structure:

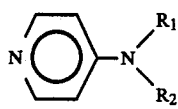

where R$_1$ and R$_2$ either stand independently of one another for a C$_1$-C$_{10}$ alkyl radical or together with the amino nitrogen can form a pyrrolidine or alkyl piperidine ring.

Preferred 4-dialkylaminopyrrolines are: 4-dimethylaminopyridine, 4-dibutylaminopyridine, 4-di-n-hexylaminopyridine, and 4-piperidinylpyridine.

The pyridine derivatives can be produced according to *Synthesis* 844 (1978).

High-boiling organic bases with tertiary nitrogen atoms can also be used as the co-catalyst, such as isoquinoline or quinoline, and inorganic basic salts, particularly alkali and alkaline earth carbonates, such as calcium carbonate.

For 100 moles of dicarboxylic acid used, 0.1 to 10 moles, preferably 1 to 5 moles each of the phosphorus-containing compound and the catalyst are used.

Normally, the operation is performed under inert gas at normal pressure. It is possible however, when desirable for one reason or another, to work at a pressure slightly above or below normal. The reaction times required to obtain sufficiently high molecular weight products are between 1 and 4 hours.

The polycondensation process is performed in the melt at temperatures between 200° and 380° C., preferable between 250° and 350° C. Three preferred embodiments of the process are as follows:

(1) The reactants and the catalysts are melted together and pre-condensed at temperatures of between 200° and 250° C. The temperature is then increased to a maximum of from 350° to 380° C., and the pre-polymers are further condensed. The build-up of molecular weight that takes place is revealed by the sharp increase in the mel viscosity.

(2) A powdered mixture of the reactants and catalysts is processed in a kneader with a gradual increase in temperature from 220° to 290° C., until the water produced by condensation is eliminated. Alternatively, it is also possible to perform the polycondensation in an extruder. Here again, a powdered mixture of the components is fed into the apparatus, and the reaction water is completely eliminated by suitable adjustment of temperature.

(3) Finally, it is possible as in Embodiment (1) to transform the starting products first to a precondensate at a temperature of from 200° to 280° C. and then to further condense the precondensate in a kneader or extruder. In the extruder, temperatures of from 280° to 350° C., preferably from 290° to 330° C., will then normally be required. This embodiment is particularly preferred.

If the end product still does not have a sufficiently high molecular weight, it is possible to increase molecular weight by secondary solid phase condensation. A person skilled in the art will be familiar with such a process.

The catalyst generally remains in the product. If it is desirable, however, it may be removed by dissolving and precipitating the reaction product in a suitable solvent, such as N-methylpyrrolidone.

In order to produce sufficiently high-molecular-weight products, it is necessary to remove the water formed during polycondensation from the reaction system. In Embodiment 1), this is accomplished by passing inert gas over or through it. The use of a vacuum is also effective.

Upon completion of the polycondensation, one obtains a more or less viscous melt of the polymer that can then be directly processed into a granulate.

The resulting products can be fabricated into films by pressing at high temperature ( >200° C.). Organic solutions of the polyamides in suitable aprotic polar solvents may also be made into cast sheets in a conventional manner.

The viscosity number J of the polyamides obtained which constitutes a measure of the relative molar mass, is determined in the following tests in mixtures of 1,2-dichlorobenzene and phenol in the volume ratio 1:1 as per DIN (German Industrial Standard) 53,728.

Other features of the invention will become apparent in the course of the following examples of the exemplary embodiments which are given for illustration of the invention and are not intended to be limiting thereof.

EXAMPLES

EXAMPLE 1

11.52 g (0.07 mole) of isophthalic acid, 30.00 g (0.07 mole) of 4,4'-bis(4-aminophenoxy)diphenylsulfone and 0.22 g triphenylphosphite are melted at 220° C. After 60 minutes, the temperature is increased to 250° C. During these 60 minutes at 250° C., the viscosity of the melt sharply increases. Next, the temperature is increased to 350° C. for another 30 minutes. A polyamide with the following properties is obtained: J=120 cm$^3$/g and T$_g$=245° C. At 300° C. the product can be pressed into transparent plates.

EXAMPLE 2

11.52 g (0.07 mole) of isophthalic acid and 30,000 g (0.07 mole) of bis-4-4'(4-aminophenoxy)diphenylsulfone are stirred with 112.8 mg (1.37 m mole) of phosphorous acid and 88.7 mg (0.69 m mole) of isoquinoline under nitrogen for 20 minutes at 250° C. and then for 20 minutes at 350° C. The water produced by the reaction and separated out during the course of the reaction is distilled off in the process. A polyamide with J=63 cm$^3$/g is obtained.

EXAMPLE 3

1,800 g (4.16 mole) of 4,4'-bis(4-aminophenoxy)diphenylsulfone, 694 g (4.18 mole) of isophthalic acid, 26.20 g (0.08 mole) of triphenylphosphite and 18.00 g (0.18 mole) of calcium carbonate are melted at 250° C. under nitrogen and then condensed with stirring for 45 minutes at 290° C. The water separated out during condensation is removed with the inert gas. The pale yellow, transparent oligomer has a J-value of 14 cm³/g in a mixture of 50 parts each of phenol and 1,2-dichlorobenzene. The second condensation is carried out in a vacuum (120 mbar) in a twin-screw extruder at a condensation temperature of 320° C. and an extrusion temperature of 345° C. and results in a viscosity figure of J=55 cm³/g.

EXAMPLE 4

48.00 g (0.11 mole) of 4,4'-bis(4-aminophenoxy)diphenylsulfone, 3.00 g of m-phenylenediamine, 23.04 g (0.14 mole) of isophthalic acid, 0.60 ml of a 50% aqueous solution of hypophosphorous acid and 0.672 g of 4-dimethylaminopyridine are stirred under nitrogen for 30 minutes at 250° C. Over the course of 20 minutes the temperature is increased to 350° C. and the product is then allowed to cool. The golden brown, transparent co-polyamide has a J-value of 33 cm³/g.

EXAMPLE 5

30.00 g (0.07 mole) of 4,4'-bis(4-aminophenoxy)diphenylsulfone, 2.30 g (0.014 mole) of terephthalic acid, 9.22 g (0.056 mole) of isophthalic acid, 0.44 g (0.0014 mole) of triphenylphosphite and 0.30 g (0.003 mole) of calcium carbonate are stirred for 20 minutes at 250° C. and the temperature is increased to 300° C. over the course of 10 minutes. A colorless, transparent product is obtained with a J-value of 37 cm³/g.

EXAMPLE 6

900 g (2.08 moles) of 4,4'-bis(4-aminophenoxy)diphenylsulfone, 347 g (2.09 moles) of isophthalic acid, 7.63 g (0.06 mole) of 4-dimethylaminopyridine and 3.41 g (0.04 mole) of phosphorous acid are melted together and stirred for 25 minutes at 290° C. An oligomer with a J-value of 13 cm³/g is obtained. The second condensation in the twin-screw extruder at 320° C. in a vacuum yields a polyamide with a J-value of 55 cm³/g.

EXAMPLE 7

60.00 g (0.14 mole) of 4,4'-bis(4-aminophenoxy)diphenylsulfone, 23.04 g (0.14 mole) of isophthalic acid, 504 mg of 4-dimethylaminopyridine and 225.6 mg of phosphorous acid are kneaded in a Haake-Rheomix Laboratory Kneader at 220° to 290° C., during which process the water resulting from condensation is eliminated. After 20 minutes a polyamide is obtained with a J-value of 21 cm³/g.

EXAMPLE 8

60.0 g (0.14 mole) of 4,4'-bis(4-aminophenoxy)diphenylsulfone, 11.52 g (0.07 mole) of terephthalic acid, 11.52 g (0.07 mole) of isophthalic acid, 225.6 mg of phosphorous acid and 504 mg of 4-dimethylaminopyridine are polycondensed for 20 minutes at 250° C. and for 25 minutes at 250° to 370° C. The polyamide obtained with a J-value of 33 cm³/g is condensed again in the laboratory kneader at 335° C. After 4 minutes, the melt has a rotation moment of 9.4 Nm.

Obviously, numerous modifications and variations of the present invention are possible in light of the above teachings. It is therefore to be understood that within the scope of the appended claims, the invention may be practiced otherwise than as specifically described herein.

What is claimed as a new and desired to be secured by Letters Patent of the United States is:

1. A process for producing high molecular weight aromatic polyamides, comprising the step of:
    condensing at least one aromatic diamine and an aromatic dicarboxylic acid in the presence of a phosphorus-containing catalyst, wherein
    (i) said aromatic diamine has the formula

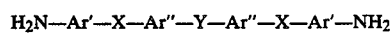

$H_2N-Ar'-X-Ar''-Y-Ar''-X-Ar'-NH_2$ wherein Ar' and Ar'' are a meta- or para-phenylene radical; X is $-O-$ and Y is $-SO_2-$ or X is $-SO_2-$ and Y is $-O-$; or a mixture of said diamine with up to 70 mole % of aromatic diamines with the formula

$H_2N-Ar((Z)_q-Ar)_r-NH_2$ wherein Ar is meta-phenylene or para-phenylene; Z is $-O-$, $-S-$, $-SO_2-$, $-CO-$, $-C(CH_3)_2-$ or mixtures thereof; q is 0 or 1, and r is 0, 1 or 2;
    (ii) said aromatic dicarboxylic acid is
        (a) isophthalic acid, or a mixture of isophthalic acid with up to 60 mole % by terephthalic acid, or said isophthalic acid and said terephthalic acid substituted by at least one $C_1-C_6$ alkyl radical, alkyl- or aryl-substituted phenyl radical, $C_1-C_6$ alkoxy radical, phenoxy radical or an alkyl- or aryl-substituted phenoxy radical, or a halogen;
        (b) an acid with the formula

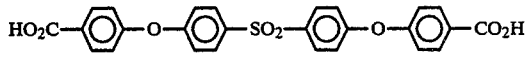

$HO_2C-\langle\bigcirc\rangle-O-\langle\bigcirc\rangle-SO_2-\langle\bigcirc\rangle-O-\langle\bigcirc\rangle-CO_2H$ (c) or a dicarboxylic acid with the general formula

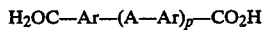

$H_2OC-Ar-(A-Ar)_p-CO_2H$ wherein Ar is meta-phenylene or paraphenylene; A is $-O-$, $-S-$, $-SO_2-$, $-CO-$or A is a single bond; and p is 0 or 1, and wherein said catalyst is triphenylphosphite or an acid derived from phosphorus having the formula $H_2PO_n$, where n is 2, 3 or 4 and
    (iii) said condensating step is performed in the melt of the starting materials.

2. The process of claim 1, wherein said aromatic dicarboxylic acid is isophthalic acid.

3. The process of claim 1, wherein said aromatic diamine is 4,4'-bis(4-aminophenoxy)diphenylsulfone.

4. The process of claim 1, further comprising:
    a co-catalyst, wherein said co-catalyst is a 4-dialkylaminopyridine, a high-boiling organic base with tertiary nitrogen atoms or an inorganic basic salt.

5. The process of claim 1, wherein said condensing step is performed at a temperature of from 200° to 380° C.

6. The process of claim 5, wherein said condensing step is performed at a temperature of from 250° to 350° C.

7. The process of claim 1, wherein said condensing step is performed in two stages, the temperature in the first stage being kept in the range of up to 250° C., and the temperature in the second stage over 300° C.

8. The process of claim 7, wherein said second stage of said condensing step is performed in a kneader or an extruder.

* * * * *